Figure 1:
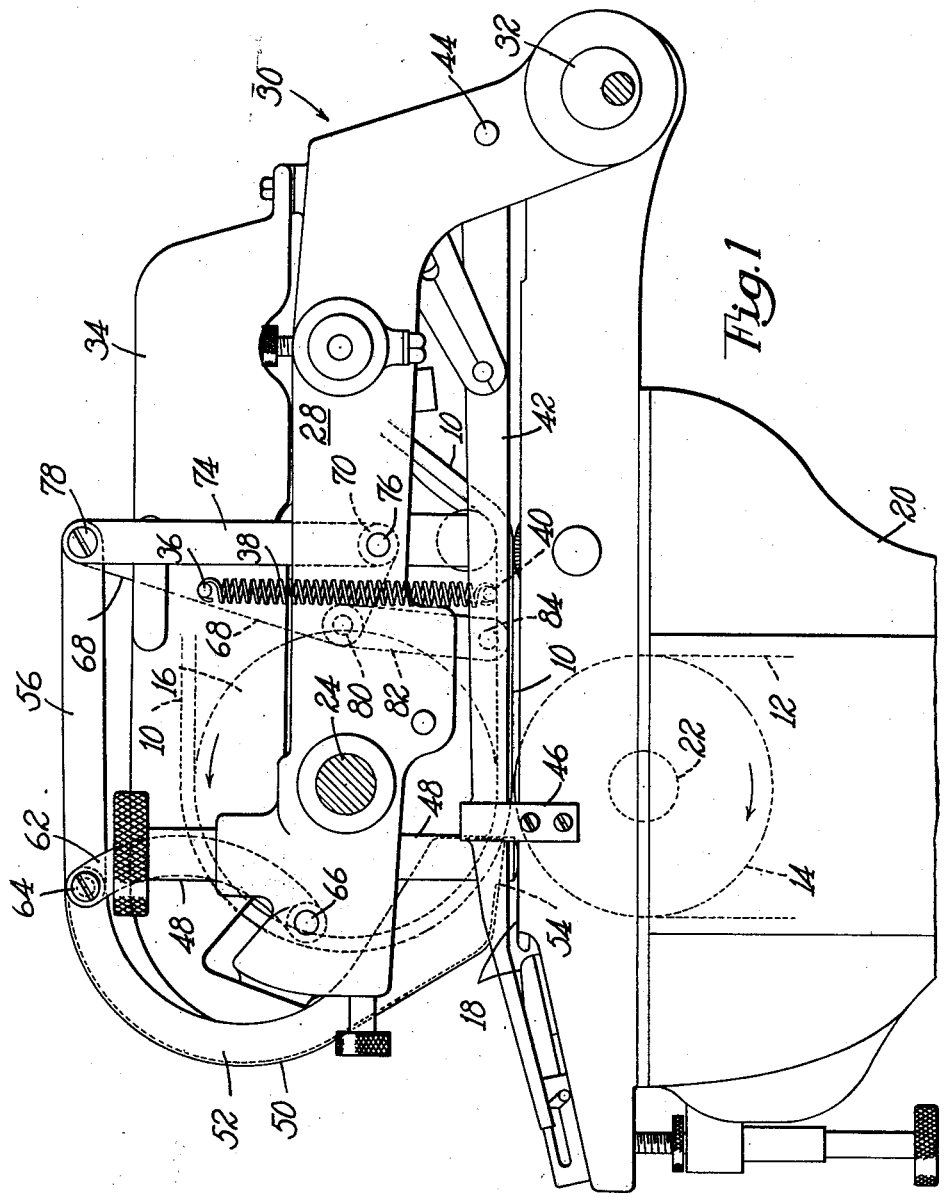

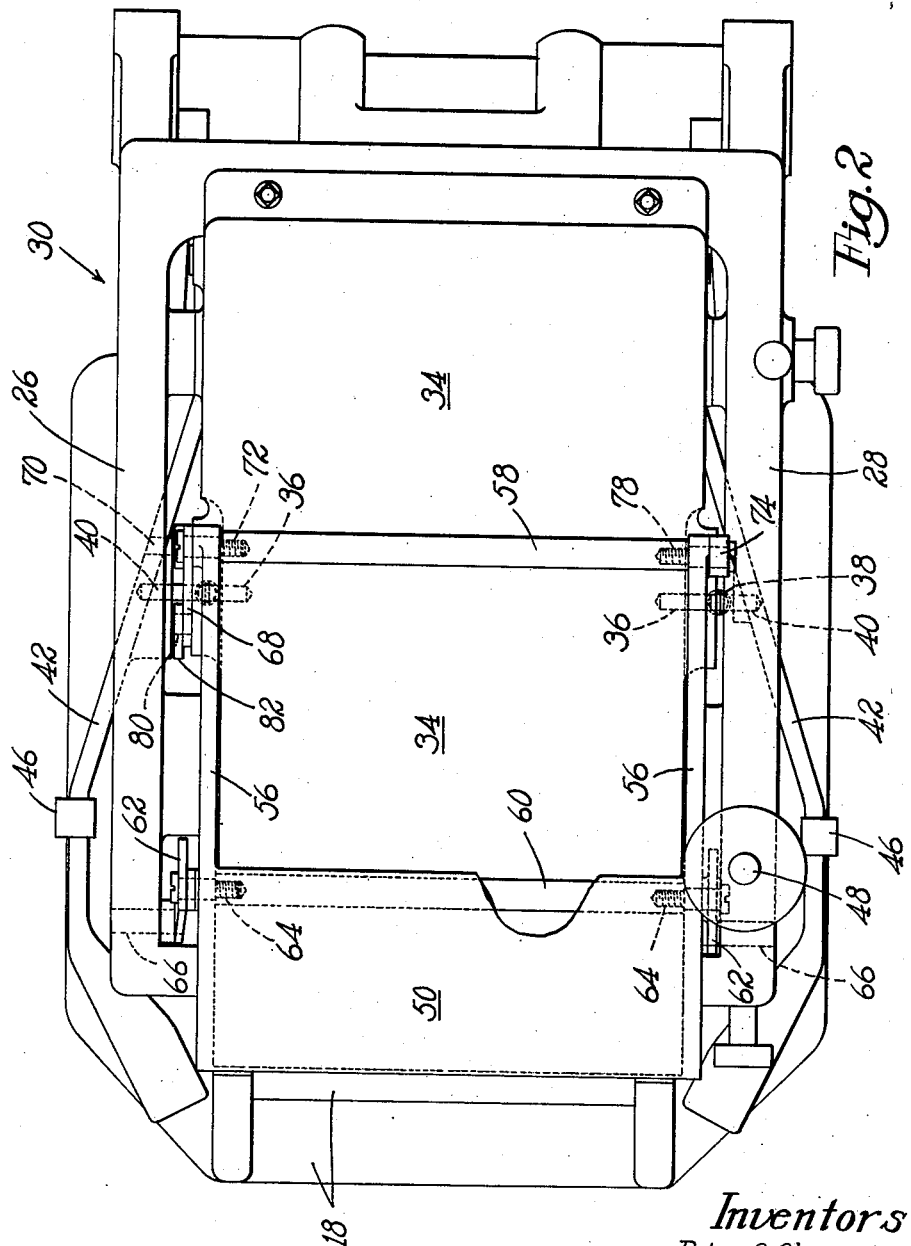

Patented Apr. 13, 1954

2,674,833

UNITED STATES PATENT OFFICE 2,674,833

MACHINE FOR ABRADING ARTICLES OF SHEET MATERIAL

Peter C. Cheverton and Arthur A. Rivington, Leicester, England, assignors to United Shoe Machinery Corporation, Flemington, N. J., a corporation of New Jersey Application April 13, 1953, Serial No. 348,478

Claims priority, application Great Britain May 27, 1952

3 Claims. (Cl. 51—137)

This invention relates to machines for abrading articles of sheet material and it is herein disclosed as embodied in a machine of the type illustrated and described in United States Letters Patent No. 2,248,191, granted July 8, 1941, upon the application of John W. Pratt.

Machines of this type are commonly used in the manufacture of boots and shoes for scouring or buffing such articles as unattached outsoles, insoles, half soles, top pieces and the like made of leather, rubber or other materials. The work is presented to the machine by an operator who advances it along a work table until the leading edge is engaged between a pair of driven rotary members, one of which controls the feed of the work by frictional contact with one surface thereof and the other of which abrades the opposite surface. The upper of the two rotary members is carried by a movable frame which can yield heightwise from a lower stopped position to accommodate the thickness of a work piece passing between the rotary members. The stop which determines the lower limiting position of the frame can be adjusted heightwise to insure proper clearance between the rotary members when there is no work piece between them. Such clearance should be somewhat less than the thickness of the thinnest work piece of a batch to be treated.

Machines of the type under consideration have been provided with guards positioned in advance of the bite of the rotary members to protect the fingers of the operator. In such a machine the guard is carried by the movable frame above mentioned, and it has a lower edge spaced high enough above the work table to provide clearance for the work pieces. This clearance depends upon the heightwise adjustment of the frame and it is greater for thick work pieces than for thin work pieces.

A guard thus mounted on the frame above referred to has the disadvantage of always being at a fixed distance from the bite of the rotary members. When the frame is adjusted heightwise for thick work pieces, the clearance between the lower edge of the guard and the work table is about the same as the thickness of an operator's fingers, hence the guard must be positioned at least a finger length in advance of the bite of the rotary members. Now, with the frame adjusted for thick work pieces, the operator can, if necessary, insert his fingers at least part way under the guard to advance the leading end of a work piece to the bite of the rotary members. However, when the frame is adjusted for thin work pieces, the clearance between the guard and the work table is insufficient to enable the operator to push the work piece past the guard with his fingers, obliging him to use a second work piece or an improvised tool.

It is an object of the present invention to provide an abrading machine having an improved finger guard which is free from the disadvantage above pointed out. In accordance with this object, a feature of the illustrated machine consists in the provision of means for moving the finger guard further from the bite of the rotary members when the stop which limits downward movement of the frame is adjusted for thick work pieces and nearer when the stop is adjusted for thin work pieces. This is accomplished in the illustrated machine by supporting the guard indirectly, by means of links, upon the frame rather than by securing it rigidly to the frame. These links permit forward and rearward swinging movement of the guard relative to the frame, and means are providing for operating through one of the links to vary the position of the guard forwardly or rearwardly, in accordance with the adjustment of the stop.

This and other features of the invention, including certain details of construction and combinations of parts, will be set forth in the following description of an illustrative machine and will be pointed out in the appended claims.

Referring now to the accompanying drawings,

Fig. 1 is a right hand side elevation of an illustrative machine embodying the invention; and Fig. 2 is a plan view of the machine shown in Fig. 1.

The illustrated machine has a rubber feed belt 10 which frictionally engages the upper surface of a work piece to control the feed of the work piece past an abrasive band 12 running over a driven roll 14 and engaging the under-surface of the work piece to perform a scouring or buffing operation thereon. The feed belt 10 runs over a driven feed roll 16 and over other rolls suitably arranged. If desired, the feed belt 10 can be omitted, in which case the feed roll 16 should be provided with a rubber cover like that of the feed roll 48 of the machine disclosed in Letters Patent No. 2,248,198 above mentioned. The rolls 14 and 16 are driven in opposite directions as indicated by the arrows on Fig. 1, the roll 14 which carries the abrasive band 12 being driven much faster than the roll 16.

which carries the feed belt 10. The frictional grip of the feed belt, however, holds the work piece from being carried along by the abrasive band and determines the speed at which the work piece is fed.

The roll 14 and the abrasive band 12 together constitute a driven rotary abrading member, and the roll 16 together with the rubber belt 10 constitutes a driven rotary feed member. Work is presented to the machine by an operator who pushes each work piece along a work table 18 until the leading edge of the work piece enters the bite of the driven rotary members above mentioned.

The work table 18 is stationary (except for purposes of adjustment) and is mounted upon a column 20. The abrading roll 14 is mounted on a driven shaft 22 which is journaled in bearings carried by the column 20, the axis of the abrading member thus being stationary and at a fixed distance below the level of the upper surface of the work table, which fixed distance can be varied by heightwise adjustment of the work table. The work table 18 has an opening through which the periphery of the abrading member extends to a level slightly above that of the upper surface of the work table.

The feed roll 16 is mounted on a driven shaft 24 journaled in bearings carried by a pair of left and right side walls 26 and 28, respectively, of a frame 30. This frame 30 is pivotally mounted, for rising and falling movements of the feed member 16, 10, upon bushings 32 mounted in the rear portion of the work table 18. Secured upon the frame 30 is a cover 34 which does not quite bridge the space between the side walls 26 and 28 and which itself has depending side walls. Secured at their upper ends to pins 36 extending laterally from the side walls of the cover 34 are a pair of springs 38. The lower ends of the springs 38 are anchored to pins 40 extending laterally from a pair of arms 42 which are pivotally mounted at their rear portions upon pins 44 extending laterally from the side walls 26 and 28. The arms 42 are normally held down at their forward portions by latches 46 secured upon the work table 18, the pivotal mounting of the arms upon the pins 44 being loose enough to permit lateral movement of the arms as may be necessary to engage them with and disengage them from the latches 46. It is evident from the foregoing description that the feed member 16, 10 is held down by a force resulting from the tension of the springs 38 as well as from the weight of the frame 30 and the parts carried thereby. Downward movement of the feed member under the influence of this force is limited by a stop screw 48 having a knurled head and extending down in threaded engagement with a boss on the side wall 28. The lower end of the screw 48 engages the work table 18. By turning the screw 48 the clearance between the feed belt 10 and the abrasive band 12 can be adjusted, and for best results it should be adjusted to a distance a little less than the thickness of the work pieces to be treated.

The machine, as so far described, is generally similar, except for the cover 34 and the optional feed belt 10, to the machine disclosed in Letters Patent No. 2,248,191 already referred to.

The illustrated machine is provided with a novel device for preventing the fingers of the operator from being caught into the bite of the rotary feed and abrading members. This device comprises a sheet metal guard 50 extending heightwise in advance of the feed and abrading members, this guard being a little wider than the front of the cover 34 and fitting closely around the front of the cover when in its most rearward position. The guard 50 may be provided with lateral rearwardly extending flanges 52 if desired. The lower portion of the guard 50 inclines down and rearwardly, and the lowermost portion is nearly horizontal, inclining rearwardly to a lower edge 54. This lower edge 54 extends horizontally across the work table 18 and it is spaced a short variable distance above the work table to permit the passage of work pieces.

The guard 50 is supported by a pair of parallel arms 56 secured to the upper portion thereof and extending rearwardly. The rear portions of the arms 56 are pivotally mounted on a shaft 58 and the forward portions are pivotally mounted on a shaft 60, these shafts being parallel to each other and to the feed roll 16. The upper ends of two similarly curved links 62 are clamped to the ends of the shaft 60 by screws 64 and the lower ends of these links are pivoted on coaxial pins 66 fixed in the side walls of the frame 30 and having their common axis parallel to the axis of the feed roll 16. One of the pins 66 is fixed in the side wall 26 and the other in the side wall 28. Each link 62 is located between one of the side walls of the frame 30 and the adjacent depending side wall of the cover 34.

A triangular link 68 is pivoted on a pin 70 extending laterally from the side wall 26 of the frame 30. This link 68 is positioned between the side wall 26 and the adjacent side wall of the cover 34 and has its upper end portion clamped to the left-hand end of the shaft 58 by a screw 72. A link 74, pivoted on a pin 76 fixed in the side wall 28 of the frame 30 is positioned between the side wall 28 and the depending side wall of the cover 34 and has its upper end portion clamped to the right-hand end of the shaft 58 by a screw 78. The pins 70 and 76 are coaxial, their common axis being parallel to the axis of the feed roll 16.

It is evident from the foregoing description that the guard 50 can swing forwardly and rearwardly on the two curved links 62 and the links 68 and 74, with the shafts 58 and 60 always remaining parallel to the axis of the feed roll 16. The arrangement of these links is such that the horizontal lower edge 54 of the guard 50 rises slightly in relation to the frame 30 as it moves forward away from the feed roll 16. The guard is held against lateral movement by the faces of the links 62, 68 and 74 bearing against the arms 56.

In order to swing the guard 50 from one position to another, a laterally extending pin 80 is fixed in the triangular link 68 forward of the pin 70. A link 82 has its upper end pivotally engaging the pin 80 and its lower end pivotally engaging a pin 84 which extends laterally from the left-hand arm 42 to provide an anchorage for the link 82, clearance being provided for the pin 84 to slide axially in the link 82 when the arms 42 are moved laterally to release them from the latches 46. When the frame 30 is raised by adjustment of the stop screw 48 to increase the clearance between the feed belt 10 and the abrasive band 12 the triangular link 68 will rock counterclockwise (as seen in Fig. 1) about the pin 80 and will cause the guard 50 to swing forward. Conversely, a lowering of the frame 30 by adjustment of the stop screw 48 will cause the guard 50 to swing rearward.

When the operator adjusts the clearance between the feed member and the abrading member to accommodate a thick work piece, the guard 50 not only is raised high enough to let the thick work piece pass under its lower edge 54 but is also moved so far forward that the operator, although he can slide his fingers some distance under the edge 54, cannot reach the bite of the feed and abrading members with his finger tips. He can, however, reach far enough under the edge 54 to be able to push the work piece until its leading edge is gripped by the bite of the feed and abrading members.

Conversely, when the operator adjusts the clearance between the feed member and the abrading member to accommodate a thin work piece, the guard 50 is lowered far enough to prevent his fingers from getting under the edge 54; but at the same time the guard is moved far enough rearwardly to enable the operator to push a work piece into the bite of the feed and abrading members even though he cannot reach (or can barely reach) under the edge 54.

Having thus described our invention what we claim as new and desire to secure by Letters Patent of the United States:

1. In a machine for abrading work pieces of sheet material, a work table, a driven rotary member engageable with one surface of a work piece on the work table, means for supporting said rotary member with its axis stationary with respect to the work table, a driven rotary member engageable with the opposite surface of the work piece on the work table, one of said rotary members being adapted to control frictionally the feed of the work piece and the other rotary member being adapted to abrade the surface of the work piece which it engages, a frame in which the second-mentioned rotary member is supported for movement toward and from the first-mentioned rotary member, means acting upon the frame to urge the second-mentioned rotary member yieldingly toward the first-mentioned rotary member to cause a work piece to be pressed between them, an adjustable stop for limiting the approach of the second-mentioned rotary member toward the first-mentioned rotary member, a finger guard positioned forward of the bite of the rotary members and having a lower edge spaced a short distance above the work table to permit the passage of a work piece, and means operated by the frame for adjusting the position of the finger guard, the last-mentioned means serving to raise the level of the finger guard above the work table and also move the finger guard further forward of the bite of the rotary members when said stop is adjusted to increase the separation between the rotary members.

2. In a machine for abrading work pieces of sheet material, a work table, a lower driven rotary abrading member engageable with the undersurface of a work piece on the work table, an upper driven rotary feed member frictionally engageable with the upper surface of the work piece to control the feed of the work piece, means for supporting the abrading member with its axis stationary with respect to the work table, a frame in which the feed member is supported for movement toward and from the abrading member, a spring acting on the frame to urge the feed member yieldingly toward the abrading member to cause a work piece to be pressed between them, an adjustable stop for limiting the approach of the feed member toward the abrading member, a finger guard positioned forward of the bite of the feed and abrading members and having a lower edge spaced a short distance above the work table to permit the passage of a work piece, and means operated by the frame to raise the level of the finger guard above the work table and to move the finger guard further forward of the bite of the feed and abrading members when said stop is adjusted to increase the separation between the feed and abrading members.

3. In a machine for abrading work pieces of sheet material, a lower driven rotary abrading member engageable with the under surface of a work piece on the work table, an upper driven feed member frictionally engageable with the upper surface of the work piece to control the feed of the work piece, means for supporting the abrading member with its axis stationary with respect to the work table, a frame in which the feed member is supported for movement toward and from the abrading member, a spring acting on the frame to urge the feed member yieldingly toward the abrading member to cause a work piece to be pressed between them, an adjustable stop for limiting the approach of the feed member toward the abrading member, a finger guard having a guard portion extending heightwise in advance of the feed and abrading members and having a supporting portion extending rearwardly, said guard portion having a lower edge spaced a short distance above the work table to permit the passage of a work piece, a pair of links each pivotally connected at one end to the supporting portion of the guard and at its opposite end to the frame to support the guard for movement forward and rearward, one of said links being positioned forwardly of the other, a third link, a pivotal connection between the upper end of the third link and one of the other of said links about which pivotal connection the link connected thereto can swing forwardly and rearwardly, and a pivotal anchorage for the lower end of the third link, whereby adjustment of the stop to increase the separation between the feed and abrading members will cause the link connected to the third link to rock forwardly about said pivotal connection and thereby move the guard forwardly as the frame rises.

No references cited.